United States Patent
Zhao et al.

(10) Patent No.: US 10,781,507 B2
(45) Date of Patent: Sep. 22, 2020

(54) ANTI-FATIGUE IN-SITU ALUMINUM-BASED COMPOSITE MATERIAL FOR HEAVY-LOAD HUBS AND PREPARATION METHOD THEREFOR

(71) Applicants: JIANGSU UNIVERSITY, Jiangsu (CN); SUMEC WHEELS CO., LTD., Jiangsu (CN)

(72) Inventors: Yutao Zhao, Jiangsu (CN); Yuanpu Peng, Jiangsu (CN); Tongxiang Fan, Shanghai (CN); Xizhou Kai, Jiangsu (CN); Gang Chen, Jiangsu (CN); Wenling Wang, Jiangsu (CN)

(73) Assignees: Jiangsu University, Jiangsu (CN); Sumec Wheels Co., Ltd., Jiangsu (CN)

( * ) Notice: Subject to any disclaimer, the term of this patent is extended or adjusted under 35 U.S.C. 154(b) by 99 days.

(21) Appl. No.: 15/771,432

(22) PCT Filed: Jun. 20, 2016

(86) PCT No.: PCT/CN2016/086358
§ 371 (c)(1),
(2) Date: Apr. 27, 2018

(87) PCT Pub. No.: WO2017/166444
PCT Pub. Date: Oct. 5, 2017

(65) Prior Publication Data
US 2019/0010580 A1 Jan. 10, 2019

(30) Foreign Application Priority Data
Apr. 1, 2016 (CN) .......................... 2016 1 0203245

(51) Int. Cl.
*C22C 1/06* (2006.01)
*C22C 1/03* (2006.01)
(Continued)

(52) U.S. Cl.
CPC ................ *C22C 1/06* (2013.01); *B22D 27/04* (2013.01); *B22D 27/11* (2013.01); *B60B 3/02* (2013.01);
(Continued)

(58) Field of Classification Search
CPC ... B22D 27/04; B22D 27/11; B60B 2360/104; C22C 1/026
See application file for complete search history.

(56) References Cited

U.S. PATENT DOCUMENTS

| | | | |
|---|---|---|---|
| 4,915,905 A | 4/1990 | Kampe et al. | |
| 2012/0152414 A1* | 6/2012 | Che | B22F 1/007 148/549 |
| 2015/0167130 A1* | 6/2015 | Steinwandel | C22F 1/02 420/420 |

FOREIGN PATENT DOCUMENTS

| | | |
|---|---|---|
| CN | 100376700 C | 3/2008 |
| CN | 101418402 A | 4/2009 |

(Continued)

*Primary Examiner* — Colleen P Dunn
*Assistant Examiner* — Nicholas A Wang
(74) *Attorney, Agent, or Firm* — Saliwanchik, Lloyd & Eisenschenk

(57) ABSTRACT

Provided are an anti-fatigue in-situ aluminum-based nano-composite material for heavy-load automobile hubs and a preparation method therefor. By means of the fine adjustment of components and a forming process, in situ nano-compositing, micro-alloying and rapid compression moulding techniques are combined. That is, after the addition of Zr and B, an in-situ reaction occurs to form a nano $ZrB_2$ ceramic reinforcement, which is distributed in aluminum crystals and crystal boundaries and bonded to a metallurgical interface kept firm with the matrix.

7 Claims, 3 Drawing Sheets

(51) Int. Cl.
*C22C 21/02* (2006.01)
*B22D 27/04* (2006.01)
*B22D 27/11* (2006.01)
*C22F 1/043* (2006.01)
*B60B 3/02* (2006.01)
*B60B 27/00* (2006.01)
*C22C 21/00* (2006.01)
*B60B 3/10* (2006.01)
*B82Y 30/00* (2011.01)
*B82Y 40/00* (2011.01)

(52) U.S. Cl.
CPC ............ *B60B 27/0015* (2013.01); *C22C 1/03* (2013.01); *C22C 21/00* (2013.01); *C22C 21/02* (2013.01); *C22F 1/043* (2013.01); *B60B 3/10* (2013.01); *B60B 2360/104* (2013.01); *B60B 2900/121* (2013.01); *B82Y 30/00* (2013.01); *B82Y 40/00* (2013.01)

(56) References Cited

FOREIGN PATENT DOCUMENTS

| | | | |
|---|---|---|---|
| CN | 101514420 A | 8/2009 |
| CN | 101760656 A | 6/2010 |
| CN | 103773999 A | 5/2014 |
| CN | 103774001 A | 5/2014 |
| CN | 103774003 A | 5/2014 |
| CN | 104550876 A | 4/2015 |
| EP | 0274972 A1 | 7/1988 |
| JP | S52148412 A | 12/1977 |
| JP | H1192849 A | 4/1999 |
| JP | 2001252754 A | 9/2001 |

\* cited by examiner

ANTI-FATIGUE IN-SITU ALUMINUM-BASED COMPOSITE MATERIAL FOR HEAVY-LOAD HUBS AND PREPARATION METHOD THEREFOR

CROSS REFERENCE TO RELATED APPLICATIONS

This application is a National Stage Application of International Application Number PCT/CN2016/086358, filed Jun. 20, 2016; which claims priority to Chinese Application No. 201610203245.3, filed Apr. 1, 2016.

TECHNICAL FIELD

The invention relates to an aluminum-based composite material, particularly to a light-weight high-strength anti-fatigue in-situ A356.2-X based composite material for a heavy-load automobile hub and a preparation method thereof.

BACKGROUND ART

Heavy-load automobiles refer to middle and large-sized automobiles in addition to ordinary passenger vehicles and particularly refer to modern motor homes, passenger cars and special equipment vehicles etc. Compared with the hub of ordinary passenger vehicles, the hub of heavy-load automobiles has higher demand in strength, modulus, anti-fatigue performance and safety (compared with the aluminum hub of the saloon car, its strength is improved by 30%, and its anti-fatigue performance is improved by 2 times). The hub, as one of the important components in the automobile traveling system, is also a safety component with higher requirement, which not only bears the weight of the automobile but also reflects the appearance modeling of the automobile. In recent ten years, the average annual growth rate of the yield of the global aluminum alloy automobile hubs is up to 7.6%. At present, in order to comply with automobile development trend of light weight, energy conservation and emission reduction, more and more heavy-load automobiles tend to use high-performance aluminum alloy hubs with light weight, good heat dissipation, attractive appearance, economy and environmental protection. However, at present, the performance of A356.2 alloy material extensively used by aluminum hubs for automobiles can only meet the requirements of the ordinary passenger vehicles, and cannot meet the requirements of higher strength and fatigue life of heavy-load automobiles, particularly high-performance heavy-load automobiles on aluminum hubs. Shrinkage cavity, shrinkage porosity, air vents, inclusion and other casting defects, the circular plastic deformation of coarse aluminum crystalline grains and breakage of coarse eutectic silicon particles and iron-based intermetallic compounds are main reasons to cause occurrence of fatigue cracks and breakage.

According to the research on the existing technical literature and review literature, at present, the strength, toughness and fatigue performance of aluminum hubs are improved further by alloying of a large quantity of rare earth elements in conjunction with melt purification, deterioration and harsh thermal treatment processes (i.e., patent CN103774001, CN103773999, CN10377003, JP52148412-A and EP274972-A). However, the harsh processing technology still has the following defects and shortcomings: (1), a large quantity of expensive rare earth elements are used, such as Sc and Gd, so that the manufacturing cost of the hub is improved substantially, but the improvement in mechanical property is insignificant, and the high-performance hubs are difficult to produce and popularize; and (2) alloying cannot effectively improve the modulus of materials, and thus cannot improve the rigidity of material radically, the material has poor anti-fatigue deformation capability and insignificant light weight benefit. Hence, in recent years, with the rapid development of the aluminum hub market of heavy-load automobiles (using international motor home market as an example, the global possession quantity of motor homes in 2014 was about 30 million, and the demands of high-performance aluminum alloy hubs for motor homes were about 20 millions in the same year), it is imperative to develop new material and new technology for aluminum hubs of heavy-load vehicles, and accelerate the development of the high-performance aluminum hub industry.

CONTENTS OF THE INVENTION

The present invention aims at the technical defect that existing A356.2 alloy cannot meet the requirements of heavy-load vehicles for higher strength, modulus and fatigue life of aluminum hubs. On the basis of A356.2 alloy, via fine adjustment of composition and molding process, the present invention combines in-situ nano compounding, microalloying and rapid pressure boost molding technology to synergistically improve the strength, toughness and anti-fatigue performance of composite hubs, wherein the anti-fatigue ability of mass-produced high-performance hubs is up to 2.5 times of United States Standard SAE J1204, and the products don't have cracks in case of $1.5 \times 10^5$ flexural fatigue tests and $1.5 \times 10^6$ radial fatigue tests.

The aluminum based composite comprises, by mass percent, the following chemical components: 6.8-7.5 of Si, 3.0-5.0 of Zr, 0.5-1.0 of B, 0.3-0.45 of Mg, 0.18-0.25 of Er, 0.18-0.25 of Y, 0.15-0.22 of Cr, 0.1-0.12 of Mn, 0.1-0.15 of Ti, 0.08-0.12 of Fe, 0.05-0.1 of Cu, and the balance of Al.

According to the present invention, firstly, microalloying element ingredients (Er, Y, Zr, Cr and Mn) in molten A356.2 alloy are regulated and are evenly dispersed, B element is introduced to be synthesized in-situ with Zr element in alloy to form a nano-$ZrB_2$ ceramic reinforcement, and the A356.2-X aluminum based composite hub with compact structure is acquired via pressurized gravity casting rapid sequential solidification molding technology in conjunction with the thermal treatment technology, wherein crystalline grains of the aluminum matrix are fine, a large number of microalloying nano precipitated particles are contained in the crystal, eutectic silicon particles are fine and round, $Mg_2Si$ phases are fine and are mainly distributed inside the crystalline grains, and meanwhile, the matrix comprises a large number of dispersed nano $ZrB_2$ ceramic reinforcements.

The present invention relates to an in-situ nano-particle reinforced A356.2-X based composite for light-weight high-strength anti-fatigue heavy-load hubs and a preparation method thereof. Through nano compounding and microalloying in conjunction with fast pressurized forming technology, aluminum matrix crystalline grains and Al—Si eutectic colonies are effectively refined, the large iron-rich phase is reduced, tissue shrinkage cavity and porosity and other casting defects are reduced while a large number of uniform and fine microalloying precipitated phases and nano-ceramic reinforcement phases are obtained in the matrix, thereby significantly improving the fatigue resistance of materials, reducing fatigue crack sources and substantially improving the anti-fatigue performance of hubs.

The preparation method of the present invention comprises the following steps:
(1) Microalloying: refining the molten and heat-preserved A356.2 alloy melt for degassing, uniformly scattering a layer of covering agent on the surface of the melt, pressing intermediate alloy of microalloying elements into the refined and degassed A356.2 aluminum alloy melt via immersion bell, and stirring uniformly with a graphite rotor and standing for later use.
   The melting and heat-preserving temperature ranges from 750 to 760° C.
   The intermediate alloy of the microalloying elements is Al—Zr, Al—Er, Al—Y, Al—Cr and Al—Mn.
(2) In-situ nano compounding: pressing B containing alloy or boron salt into microalloying A356.2 aluminum alloy melt prepared in the step (1) via the graphite immersion bell, starting the graphite stirring rotor to promote the melting of B containing alloy or promote boron salt to fully contact with the microalloying A356.2 aluminum alloy melt and effectively absorb B element, making the introduced B element in-situ react with Zr element introduced during melt microalloying to synthesize $ZrB_2$ nano-ceramic reinforcement, and acquiring the composite melt and standing for later use.
   Pressurized gravity casting rapid sequential solidification molding: transferring the composite melt prepared in the step (2) into a heat-preserving furnace of hub forming equipment with pressurized gravity casting rapid sequential solidification molding to perform the casting molding process of hubs. The specific structure and operating way of equipment is shown in Chinese patent CN 2015100017897.
(3) Thermal treatment: carrying out thermal treatment for the casting hub acquired in step (3) to achieve the effective precipitation of microalloying element phase and the refining and round passivation of eutectic silicon particles, and finally acquiring the composite hub.

In the microalloying, the ingredients of A356.2 alloy are adjusted, rare earth elements Er and Y as well as Zr element are used as the additive ingredient, and the content of Cr and Mn is improved. The aim is to form fine intermetallic compound $Al_3Er$, $Al_7Y$ and $Al_3Zr$ having good interface coherency with α-Al by combination between Er, Y, Zr and Al in the earlier stage of alloy solidification, which can be used as the efficient heterogeneous nucleation core of the aluminum phase to significantly improve the degree of ingredient supercooling and the ingredient supercooling area, improve nucleation rate and refine the primary α-Al phase; in the aluminum-silicon eutectic colony forming process, rare earth elements Er and Y can be adsorbed to the surface of eutectic silicon to inhibit the transversely-growing refined eutectic colony of silicon phase, and fine round silicon particles can be acquired during the follow-up thermal treatment; and after solidification, Er, Y and Zr elements dissolved in alloy can form inside the crystalline grain a large number of $L1_2$ type nano-precipitated phases (i.e., $Al_3Zr$, $Al_3Er$, etc.) having good interface coherent structure with aluminum, thereby effectively hindering the cross slip and cross slide of dislocation, significantly improving the fatigue resistance of aluminum crystalline grains and avoiding the circular fatigue plastic deformation of aluminum crystalline grains. Cr and Mn elements with improved content can not only be combined with iron in alloy to form fine precipitates to avoid the generation of large iron-rich phase which can easily become fatigue crack source, but can also effectively inhibit the precipitates of $Mg_2Si$ (the main strengthening phase of A356.2) in the crystal boundary, thereby improving the strength and toughness of materials and reducing the risk of cracking of the crystal boundary under fatigue.

In the microalloying, the content by mass percent of the adjusted elements in the A356.2 alloy melt is: Zr 3.0-5.0, Er 0.18-0.25, Y 0.18-0.25, Cr 0.15-0.22, Mn 0.1-0.12.

Intermediate alloy of the microalloying elements gives priority to intermediate alloy with high content of alloy elements and low content of impurity elements (the content of impurity elements is less than 0.05 wt. %), such as, Al-15Zr, Al-20Er, Al-20Y, Al-20Cr and Al-10Mn, to reduce the using amount of intermediate alloy and avoid difficulty to the regulation and control of alloy ingredients or instability in product performance owing to the introduction of other impurity elements in intermediate alloy.

The in-situ nano compounding means that under the use of low Gibbs free energy of $ZrB_2$, and the thermodynamic-dynamic characteristics of low solubility and low thermal diffusion coefficient of Zr in Al, B element is introduced in the microalloyed melt, making it produce dispersed nano-$ZrB_2$ ceramic reinforcement in situ with the introduced Zr element in alloy, wherein the ceramic reinforcement has a size of 15-75 nm and a content of 2.57-5.14 wt. %. On one side, the nano-$ZrB_2$ and $Al_3Zr$ generated in the melt react in dynamic balance: $ZrB_2+4Al \rightleftharpoons 2AlB_2+Al_3Zr$, and form a large number of free α-Al crystal nuclei by means of peritectic reaction: Liquid+$Al_3Zr$—α-Al, thereby strengthening the heterogeneous nucleation performance of $Al_3Zr$ and efficiently refining matrix crystalline grains; and on the other side, in-situ synthesized $ZrB_2$ ceramic reinforcements are dispersed in the matrix after alloy solidification, and improve dislocation density around the reinforcements via physical mismatch (thermal expansion, modulus, etc.) between the reinforcements and the matrix while achieving the effects of strengthening dispersion and bearing, thereby effectively strengthening and hardening the matrix and significantly improving the anti-fatigue strength of the matrix.

For the pressurized gravity casting rapid sequential solidification molding, the feed port cooling system and the pressurization mechanism are arranged additionally on the basis of the original gravity casting equipment and are transformed to achieve the sectional cooling of the mold; and the inlet portion of the melt (alloy or composite material) injected into the cavity is first solidified to seal the cavity, the pressurization mechanism is then started, so that the closed melt regulates the cooling system of the mold under a certain pressure (50-250 MPa) to achieve the fast and sequential solidification of the casting. The specific structure of equipment and the operating way are shown in Chinese patent CN 2015100017897. Through the addition and upgrade of the pressurization system and supporting mechanisms thereof, temperature gradient at the front edge of the liquid-solid interface is increased, and the feeding pressure of liquid state melt between dendritic crystals is increased, thereby effectively reducing tissue shrinkage cavity and porosity and other casting defects, refining tissue, reducing the fatigue crack source and improving the strength and fatigue resistance of the matrix. Relative to the traditional pressure casting (low-pressure casting and die casting), the pressurized gravity casting rapid sequential solidification molding technology of the present invention has the characteristics of small investments on equipment transformation, capability of producing complex structural casting (hubs, etc.) and flexible pressure regulation.

The in-situ nano-particle reinforced A356.2-X based composite material for light-weight high-strength anti-fatigue heavy-load hubs and a preparation method thereof of the present invention effectively refines aluminum based crystalline grains and Al—Si eutectic colonies through nano compounding and microalloying in conjunction with fast pressurized forming technology, the coarse iron-rich phase is reduced, the sequential solidification of the melt under certain pressure and tissue shrinkage cavity and porosity and other casting defects are reduced while a large number of uniform and fine microalloying precipitated phases and nano-ceramic reinforcement phases are obtained, thereby significantly improving the fatigue resistance of materials, reducing fatigue crack sources and substantially improving the anti-fatigue performance of hubs. The quality standard applied in the hub product made of in-situ nano-particle reinforced A356.2-X based composite material for light-weight high-strength anti-fatigue heavy-load hubs mainly is according to the United States Standard, mainly comprising: SAE J1204 Wheel Test Procedures for Motor Caravans and Multi-Purpose Trailers, SAEJ267 Performance Requirements and Test Procedure for Wheels of Trucks and Buses, SAE J1992 Test Procedures and Performance Requirements for Wheels/Rims of Military Vehicles, SAE J175 Wheels Impact Test Procedures for Road Vehicles, etc.

EMBODIMENTS

Figure 1:
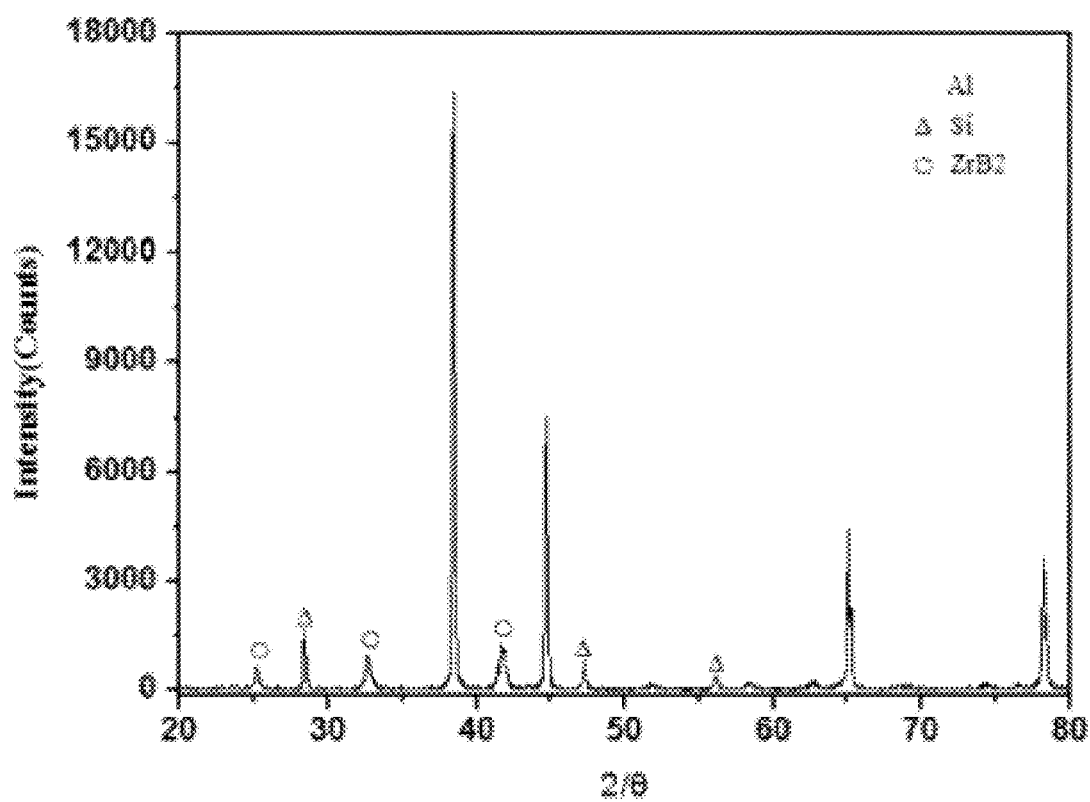
FIG. 1 is the XRD analysis map of the hub made of in-situ nano-particle reinforced A356.2-X based composite material for light-weight high-strength anti-fatigue heavy-load hubs. The diffraction peaks of $ZrB_2$ and Si can be seen in the map in addition to the diffraction peak of Al.

The implementation scheme of the present invention is described further in conjunction with the accompanying drawings: the following examples give the detailed enforcement mode and the specific operation process on the premise of the technical solution of the invention, but the scope of protection of the invention is not limited to the examples below.

Example 1

Taking Al-15Zr, Al-20Er, Al-20Y, Al-20Cr, Al-10Mn and Al-10B intermediate alloy and A356.2 alloy as raw materials, the A356.2-X composite material hub is prepared via pressurized gravity casting rapid sequential solidification molding technology.

Transferring the molten 500 Kg commercial A356.2 alloy (750-760° C.) is transferred into insulated degassing tundish, and putting the graphite rotor in reversing rotation, into which argon can be introduced, into the tundish for refining and degassing for 5 min; scattering a layer of covering agent uniformly on the surface of the alloy melt of the tundish, after the covering agent is scattered uniformly on the surface layer of alloy and forms a protective film, pressing the weighed Al-15Zr, Al-20Er, Al-20Y, Al-20Cr and Al-10Mn intermediate alloy into the alloy melt by the graphite immersion bell through the covering agent, making the graphite rotor rotate reversely for 15 min to promote the fast melting and uniform scattering of the intermediate alloy, standing for 5-10 min for later use, adjusting to make the mass percent of elements in alloy as follows: Zr 3.5, Er 0.2, Y 0.2, Cr 0.18, Mn 0.11; pressing the weighed Al-10B intermediate alloy into the melt using immersion bell with stirring by the graphite rotor for 10 min, making B element (the content is 0.65 wt. % of A356.2-X composite material hub) in-situ react with the Zr element uniformly dispersed in the melt to synthesize the uniformly dispersed nano-$ZrB_2$ ceramic reinforcement; removing the graphite stirring rotor, stopping heat preservation and heating, cooling the composite melt to 720-730° C., removing the surface covering agent to acquire the composite melt, and standing for 5-10 min for later use; and transferring the composite melt into the heat-preserving furnace of pressurized gravity casting rapid sequential solidification molding device for casting forming of the hub (pressurized solidification pressure is 150 MPa), and finally, carrying out thermal treatment for the casting blank of the hub to acquire the machined hub blank.

Sampling analysis indicates that after T6 (545° C.×3.5 h+135° C.×3 h) treatment, the elasticity modulus of the spoke is 77 GPa, strength is up to 325 MPa, the percentage elongation is 13.6%, cracks are avoided under $1.2 \times 10^5$ flexural fatigue tests and $1.3 \times 10^6$ radial fatigue tests, which exceeds U.S. SAE J1204 Standard Requirements for Motor Home Hubs (tensile strength 300 MPa, percentage elongation 10%, $5 \times 10^4$ flexural fatigue tests, and $6 \times 10^5$ radial fatigue tests).

Example 2

Taking Al-15Zr, Al-20Er, Al-20Y, Al-20Cr and Al-10Mn intermediate alloy, $KBF_4$ and A356.2 alloy as raw materials, the A356.2-X composite material hub is prepared via the pressurized gravity casting rapid sequential solidification molding technology.

Figure 2:
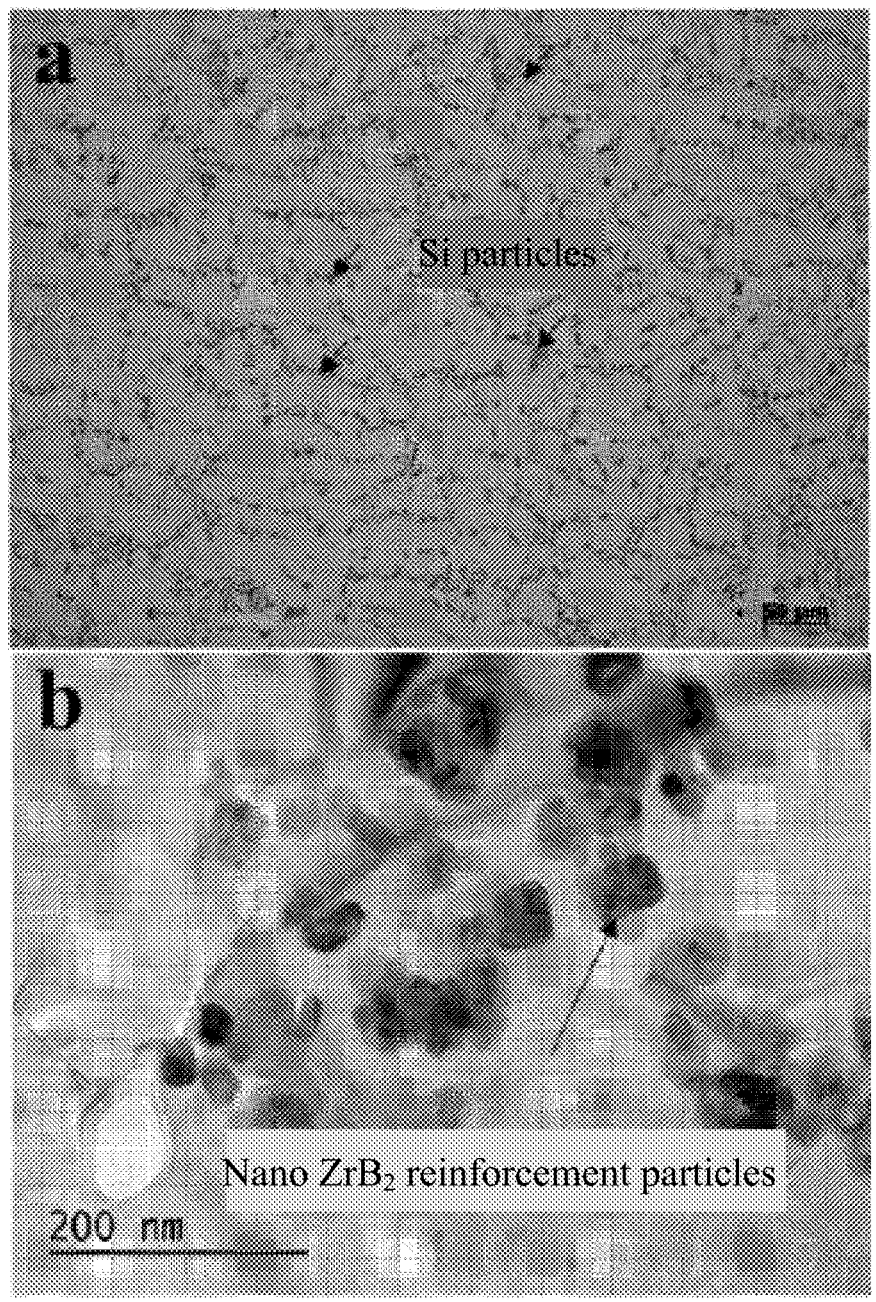
FIG. 2 is the tissue graph of the hub made of in-situ nano-particle reinforced A356.2-X based composite material for light-weight high-strength anti-fatigue heavy-load hubs: (a) the OM photo of the morphology distribution of silicon particles in the matrix; and (b) the TEM photo of the nano-ZrB2 reinforcement synthesized in-situ in the crystalline grains. It can be seen from the metallographic structure photo of the composite material in FIG. 2a that the Si phase in the composite material prepared in the present application is in fine spherical shape; and it can be seen from the transmission electron microscope photo of the composite material in FIG. 2b that dispersed nano-$ZrB_2$ in-situ nano-ceramic reinforcement phases are dispersed inside the prepared composite crystalline grains.
Figure 4:
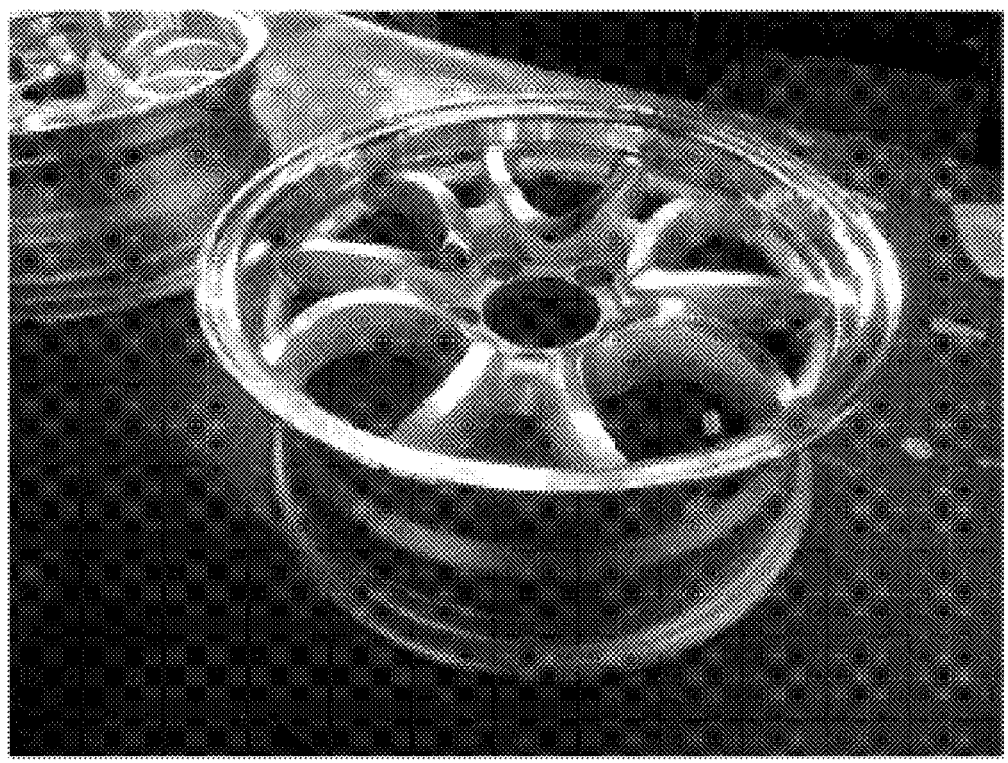
FIG. 4 is the real product picture of the hub made of in-situ nano-particle reinforced A356.2-X based composite materials for light-weight high-strength anti-fatigue heavy-load hubs.

Using Al-15Zr, Al-20Er, Al-20Y, Al-20Cr and Al-10Mn intermediate alloy for introduction of microalloying element, firstly, adjusting the mass percent of the elements in alloy as follows: Zr 4.5, Er 0.25, Y 0.18, Cr 0.22, Mn 0.12 (the specific steps are the same as those of the example 1); pressing the weighed $KBF_4$ into the melt using immersion bell and stirring by the graphite rotor for 10 min, making B element (the content is 0.89 wt. % of A356.2-X composite material hub) in-situ react with the Zr element uniformly dispersed in the melt to synthesize the uniformly dispersed nano-$ZrB_2$ ceramic reinforcement; removing the graphite stirring rotor, stopping heat preservation and heating, cooling the composite melt to 720-730° C., removing the surface covering agent to acquire the composite melt, and standing for 5-10 min for later use; and transferring the composite melt into the heat-preserving furnace of the pressurized gravity casting rapid sequential solidification molding device for the casting forming of the hub (pressurized solidification pressure is 250 MPa), and finally, carrying out thermal treatment for the casting blank of the hub to acquire the machined hub blank. FIGS. 1 and 2 are respectively the XRD map and tissue graph of the hub made of A356.2-X based composite material, and FIG. 4 is the real product picture of the hub made of in-situ nano-particle reinforced A356.2-X based composite material for light-weight high-strength anti-fatigue heavy-load hubs prepared according to the present invention.

Sampling analysis indicates that after T6 (545° C.×3.5 h+135° C.×3 h) treatment, the elasticity modulus of the spoke is 80 GPa, strength is up to 345 MPa, the percentage elongation is 13%, cracks are avoided under $1.5×10^5$ flexural fatigue tests and $1.5×10^6$ radial fatigue tests, which exceeds U.S. SAE J1204 Standard Requirements for Motor Home Hubs (tensile strength 300 MPa, percentage elongation 10%, $5×10^4$ flexural fatigue tests, and $6×10^5$ radial fatigue tests).

Example 3

Taking Al-15Zr, Al-15Er, Al-10Y, Al-5Cr and Al-10Mn intermediate alloy, $KBF_4$, and A356.2 alloy as raw materials, the A356.2-X composite material hub is prepared via the pressurized gravity casting rapid sequential solidification molding technology.

Using Al-15Zr, Al-15Er, Al-10Y, Al-5Cr and Al-10Mn intermediate alloy for introduction of microalloying element, firstly, adjusting the mass percent of the elements in alloy as follows: Zr 4.0, Er 0.2, Y 0.25, Cr 0.18, Mn 0.1 (the specific steps are the same as those of the example 1); pressing the weighed $KBF_4$ into the melt using immersion bell and stirring by the graphite rotor for 10 min, making B element (the content is 0.77 wt. % of A356.2-X composite material hub) in-situ react with the Zr element uniformly dispersed in the melt to synthesize the uniformly dispersed nano-$ZrB_2$ ceramic reinforcement; removing the graphite stirring rotor, stopping heat preservation and heating, cooling the composite melt to 720-730° C., removing the surface covering agent to acquire the composite melt, and standing for 5-10 min for later use; and transferring the composite melt into the heat-preserving furnace of the pressurized gravity casting rapid sequential solidification molding device for the casting forming of the hub (pressurized solidification pressure is 50 MPa), and finally, carrying out thermal treatment for the casting blank of the hub to acquire the machined hub blank.

Sampling analysis indicates that after T6 (545° C.×3.5 h+135° C.×3 h) treatment, the elasticity modulus of the spoke is 79 GPa, strength is up to 315 MPa, the percentage elongation is 14.7%, cracks are avoided under $1×10^5$ flexural fatigue tests and $1.2×10^6$ radial fatigue tests, which exceeds U.S. SAE J1204 Standard Requirements for Motor Home Hubs (tensile strength 300 MPa, percentage elongation 10%, $5×10^4$ flexural fatigue tests, and $6×10^5$ radial fatigue tests).

Comparison Embodiment

Comparison Example 1

Taking Al-15Zr intermediate alloy, $KBF_4$, and A356.2 alloy as raw materials, the A356.2 composite material hub is prepared via the pressurized gravity casting rapid sequential solidification molding technology (microalloying is not used).

Figure 3:
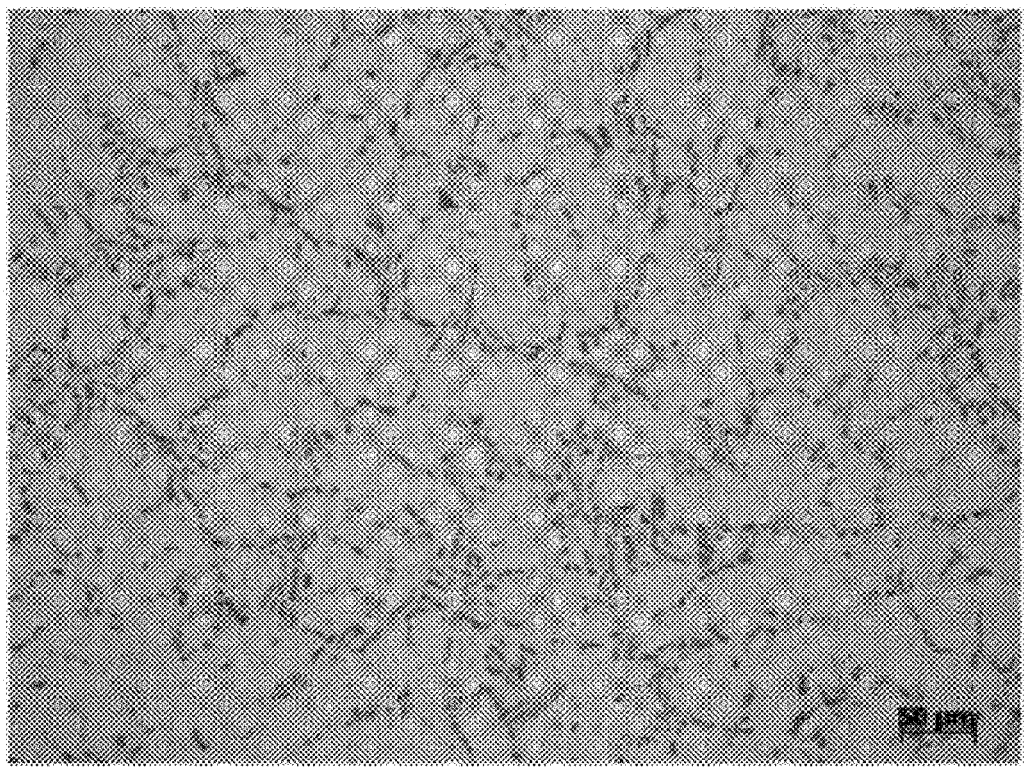
FIG. 3 is the tissue graph of the A356.2 composite material hub, which is prepared in conjunction with nano compounding and fast pressurized forming technology. It can be seen that compared with the hub made of composite materials (FIG. 2a) which is prepared in conjunction with microalloying, in-situ nano compounding and fast pressurized forming in the example 2, the hub made of A356.2 composite materials which is prepared in conjunction with nano compounding and fast pressurized forming technology has coarser crystalline grains, and the Si phase is relatively coarse and has poor uniformity.

Using Al-15Zr intermediate alloy for introduction of Zr element, and adjusting the mass percent of Zr element in alloy to 4 wt. % (the specific steps are the same as those of the example 1); pressing the weighed $KBF_4$ into the melt using immersion bell and stirring by the graphite rotor for 10 min, making B element (the content is 1.09 wt. % of alloy, so the molar ratio of Zr to B in alloy is 1:2) in-situ react with the Zr element uniformly dispersed in the melt to synthesize the uniformly dispersed nano-$ZrB_2$ ceramic reinforcement; removing the graphite stirring rotor, stopping heat preservation and heating, cooling the composite melt to 720-730° C., removing the surface covering agent to acquire the composite melt, and standing for 5-10 min for later use; and transferring the composite melt into the heat-preserving furnace of pressurized gravity casting rapid sequential solidification molding device for the casting forming of the hub (pressurized solidification pressure is 250 MPa), and finally, carrying out thermal treatment for the casting blank of the hub to acquire the machined hub blank. FIG. 3 is the tissue graph of the A356.2 composite material hub prepared only by combining nano compounding and the fast pressurized forming technology. It can be seen that compared with the composite material hub (FIG. 2a) prepared in conjunction with microalloying, in-situ nano compounding and fast pressurized forming in the example 2, the composite material hub in the comparison example has coarser crystalline grains, and the Si phase thereof is relatively large and has poor uniformity.

Sampling analysis indicates that after T6 (545° C.×3.5 h+135° C.×3 h) treatment, the elasticity modulus of the spoke is 80.3 GPa, strength is up to 305 MPa, the percentage elongation is 10.7%, cracks are avoided under $1.0×10^5$ flexural fatigue tests and $7.8×10^5$ radial fatigue tests. Although it exceeds U.S. SAE J1204 Standard Requirements for Motor Home Hubs (tensile strength 300 MPa, percentage elongation 10%, $5×10^4$ flexural fatigue tests, and $6×10^5$ radial fatigue tests), compared with the composite material hub prepared in conjunction with microalloying, in-situ nano compounding and fast pressurizing forming in the example 2, its performance is still reduced substantially.

Comparison Example 2

Taking Al-15Zr, Al-20Er, Al-10Y, Al-10Cr and Al-10Mn intermediate alloy and A356.2 alloy as raw materials, the A356.2-X alloy hub is prepared via pressurized gravity casting rapid sequential solidification molding technology (nano compounding is not used).

Using Al-15Zr, Al-20Er, Al-10Y, Al-10Cr and Al-10Mn intermediate alloy for introduction of microalloying element, firstly, adjusting the mass percent of the elements in alloy as follows: Zr 0.5, Er 0.25, Y 0.18, Cr 0.22, Mn 0.12 (the specific steps are the same as those of the example 1); removing the graphite stirring rotor, stopping heat preservation and heating, cooling the alloy melt to 720-730° C., removing the surface covering agent to acquire the composite melt, and standing for 5-10 min for later use; and transferring the composite melt into the heat-preserving furnace of the pressurized gravity casting rapid sequential solidification molding device for the casting forming of the hub (pressurized solidification pressure is 250 MPa), and finally, carrying out thermal treatment for the casting blank of the hub to acquire the machined hub blank.

Sampling analysis indicates that after T6 (545° C.×3.5 h+135° C.×3 h) treatment, the elasticity modulus of the spoke is 71 GPa, strength is up to 302 MPa, the percentage elongation is 12.1%, cracks are avoided under $6\times10^4$ flexural fatigue tests and $7.4\times10^5$ radial fatigue tests, which exceeds U.S. SAE J1204 Standard Requirements for Motor Home Hubs (tensile strength 300 MPa, percentage elongation 10%, $5\times10^4$ flexural fatigue tests, and $6\times10^5$ radial fatigue tests). Compared with the composite material hub prepared in conjunction with microalloying, in-situ nano compounding and fast pressurized forming in the example 2, its performance is still reduced substantially.

Comparison Example 3

Taking Al-15Zr, Al-20Er, Al-10Y, Al-10Cr and Al-10Mn intermediate alloy, $KBF_4$ and A356.2 alloy as raw materials, the A356.2-X composite material hub is prepared via the ordinary gravity casting forming technology (the fast pressurized forming technology is not used).

Using Al-15Zr, Al-20Er, Al-10Y, Al-10Cr and Al-10Mn intermediate alloy for introduction of microalloying element, firstly, adjusting the mass percent of the elements in alloy as follows: Zr 4.5, Er 0.25, Y 0.18, Cr 0.22, Mn 0.12 (the specific steps are the same as those of the example 1); pressing the weighed $KBF_4$ into the melt using immersion bell and stirring by the graphite rotor for 10 min, making B element (the content is 0.89 wt. %) in-situ react with the Zr element uniformly dispersed in the melt to synthesize the uniformly dispersed nano-$ZrB_2$ ceramic reinforcement; removing the graphite stirring rotor, stopping heat preservation and heating, cooling the composite melt to 720-730° C., removing the surface covering agent to acquire the composite melt, and standing for 5-10 min for later use; and transferring the composite melt into the heat-preserving furnace of the ordinary gravity casting forming equipment for the casting forming of the hub, and finally, carrying out thermal treatment for the casting blank of the hub to acquire the machined hub blank.

Sampling analysis indicates that after T6 (545° C.×3.5 h+135° C.×3 h) treatment, the elasticity modulus of the spoke is 78.3 GPa, strength is up to 315 MPa, the percentage elongation is 11.4%, cracks are avoided under $1.1\times10^5$ flexural fatigue tests and $9.2\times10^5$ radial fatigue tests. Although it exceeds U.S. SAE J1204 Standard Requirements for Motor Home Hubs (tensile strength 300 MPa, percentage elongation 10%, $5\times10^4$ flexural fatigue tests, and $6\times10^5$ radial fatigue tests), compared with the composite material hub prepared in conjunction with microalloying, in-situ nano compounding and fast pressurizing forming in the example 2, its performance is still reduced.

The invention claimed is:

1. An anti-fatigue in-situ aluminum based composite material for automobile hubs, comprising, by mass percent, the following chemical components: 6.8-7.5 of Si, 3.0-5.0 of Zr, 0.5-1.0 of B, 0.3-0.45 of Mg, 0.18-0.25 of Er, 0.18-0.25 of Y, 0.15-0.22 of Cr, 0.1-0.12 of Mn, 0.1-0.15 of Ti, 0.08-0.12 of Fe, 0.05-0.1 of Cu, and the balance of Al, wherein said composite material is prepared according to the following steps:
microalloying A356.2 aluminum alloy melt;
carrying out in-situ nano compounding for the microalloyed A356.2 aluminum alloy melt;
carrying out pressurized gravity casting rapid sequential solidification molding for the A356.2 aluminum alloy melt that has been subjected to in-situ nano compounding; and
carrying out thermal treatment for the hub formed with a casting, combining microalloying, in-situ nano compounding and pressurized gravity casting rapid sequential solidification molding,
wherein, for the step of pressurized gravity casting rapid sequential solidification molding, a feed port cooling system and a pressurization mechanism are arranged additionally on the basis of the original gravity casting equipment and are transformed to achieve a sectional cooling of a mold, and
wherein an inlet portion of the alloy melt or composite material injected into a cavity is first solidified to seal the cavity, the pressurization mechanism is then started, so that the closed melt regulates the feed port cooling system of the mold under a pressure of 50-250 MPa to achieve sequential solidification of the casting.

2. The anti-fatigue in-situ aluminum based composite material according to claim 1, wherein the step of microalloying the A356.2 aluminum alloy melt comprises the following steps:
refining molten and heat-preserved A356.2 aluminum alloy melt for degassing;
uniformly scattering a layer of covering agent on a surface of the A356.2 aluminum alloy melt;
pressing an intermediate alloy of microalloying elements into the refined and degassed A356.2 aluminum alloy melt via an immersion bell; and
stirring uniformly with a graphite rotor and allowing to stand for later use.

3. The anti-fatigue in-situ aluminum based composite material according to claim 2, wherein a melting and heat-preservation temperature of the A356.2 aluminum alloy is 750-760 degrees C., and wherein the intermediate alloy of the microalloying element comprises Al—Zr, Al—Er, Al—Y, Al—Cr, and Al—Mn.

4. The anti-fatigue in-situ aluminum based composite material according to claim 2, wherein the intermediate alloy of the microalloying element comprises Al-15Zr, Al-20Er, Al-20Y, Al-20Cr, and Al-10Mn.

5. The anti-fatigue in-situ aluminum based composite material according to claim 2, wherein the step of microalloying the A356.2 aluminum alloy melt adjusts ingredients of the A356.2 aluminum alloy melt by introducing Er, Y, and Zr as additive ingredients, and increasing the content of Cr and Mn in the A356.2 aluminum alloy melt, after which the mass percent of elements in the A356.2 aluminum alloy melt is as follows: 3.0-5.0 of Zr, 0.18-0.25 of Er, 0.18-0.25 of Y, 0.15-0.22 of Cr, and 0.1-0.12 of Mn.

6. The anti-fatigue in-situ aluminum based composite material according to claim 1, wherein the step of carrying out in-situ nano compounding for the microalloyed A356.2 aluminum alloy melt comprises the following steps:
pressing a boron containing alloy or boron salt via a graphite immersion bell into the microalloyed A356.2 aluminum alloy melt;

starting a graphite stirring rotor to promote melting of the boron containing alloy or to promote the boron salt to fully contact with the A356.2 aluminum alloy melt and effectively absorb boron;

making the boron from the boron containing alloy or boron salt react in-situ with Zr introduced during the microalloying of the A356.2 aluminum alloy melt to synthesize a $ZrB_3$ nano-ceramic reinforcement; and acquiring the resulting composite melt and allowing it to stand for later use.

7. The anti-fatigue in-situ aluminum based composite material according to claim 1, wherein the step of in-situ nano compounding comprises introducing boron into the microalloyed A356.2 aluminum alloy melt, making it react in-situ with Zr introduced during the microalloying of the A356.2 aluminum alloy melt to produce a scattered nano-$ZrB_2$ ceramic reinforcement, wherein a size of the $ZrB_2$ is 15-75 nm, and a content of the $ZrB_2$ is 2.57-5.14 wt. %.

* * * * *